March 30, 1926.
P. GROSSET
SCREW JOINT
Filed Oct. 18, 1924
1,578,311
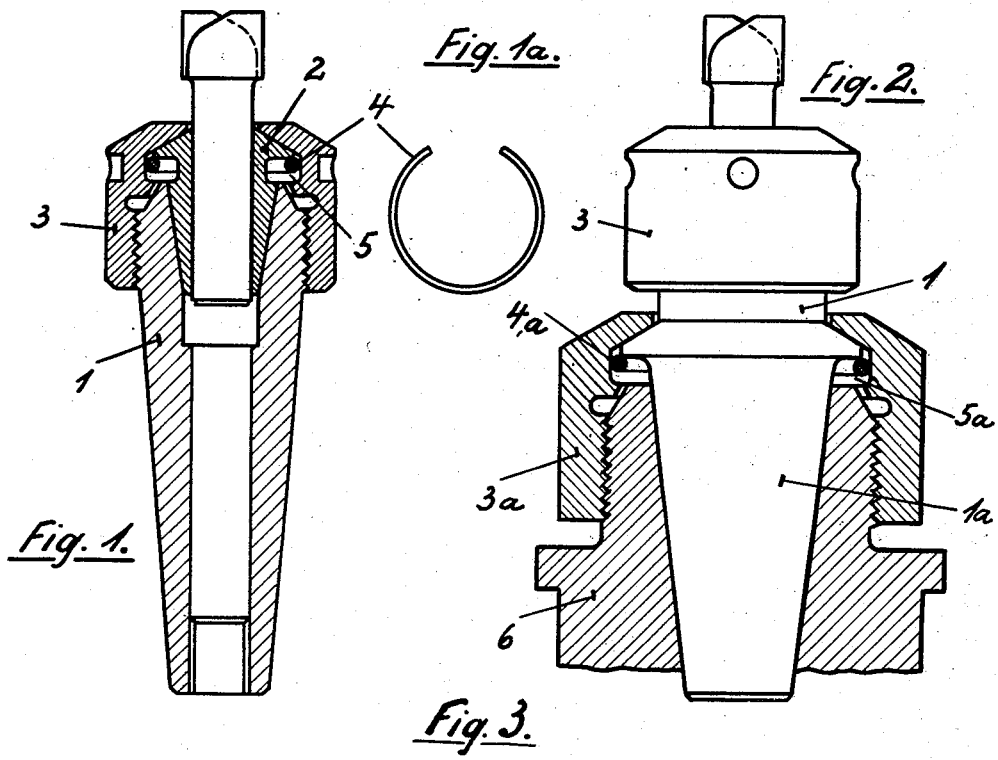
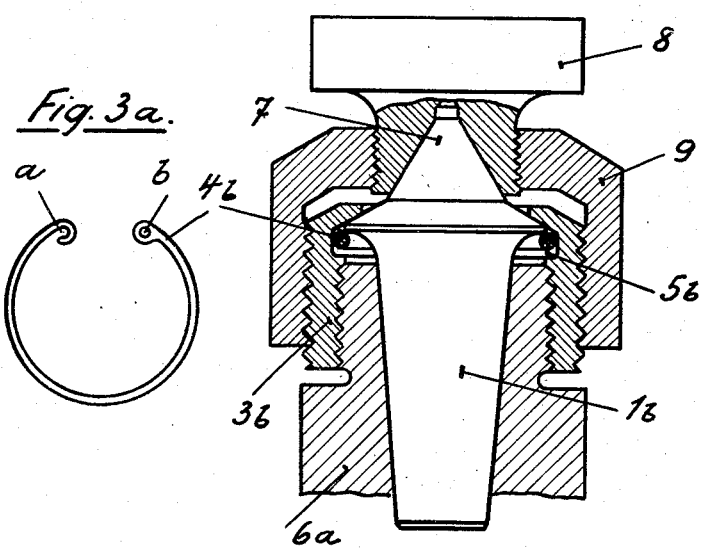
Witnesses:
Inventor:
Paul Grosset Patented Mar. 30, 1926.

1,578,311

UNITED STATES PATENT OFFICE.

PAUL GROSSET, OF ALTONA-OTTENSEN, GERMANY.

SCREW JOINT.

Application filed October 18, 1924. Serial No. 744,408.

*To all whom it may concern:*

Be it known that I, PAUL GROSSET, a German citizen, and residing at Altona-Ottensen, Germany, have invented certain new and useful Improvements in Screw Joints (for which I have made application for patent in Germany on February 13th, 1924, No. 60,684), of which the following is a specification.

This invention relates to an improvement in screw-joints of the type in which a flanged conical member is secured within a correspondingly conical seat of a body by means of a cap nut screwed over said body and engaging over the flange of said conical member, said nut having an interior ring screwed therein, by means of which it engages behind said flange so as to withdraw the conical member from its seat when loosening said nut.

According to the invention, I provide, instead of said interior ring screwed in the nut, an annular recess in said nut in which a springy split ring is so inserted that it forms an inner annular projection in said nut for the same purpose as said screwed ring above-mentioned. The advantage of this improved arrangement, above the known art, is that the parts of the joint can be very quickly mounted and dismounted, which is not the case with an interior screwed ring in the nut the screwing and unscrewing of which takes a rather long time.

The accompanying drawing shows different modes of application of the subject matter of the present invention, in central longitudinal sections: Fig. 1 illustrating a drill chuck, Fig. 1ᵃ a separate springy split ring, Fig. 2 said chuck inserted in a lathe spindle, Fig. 3 the arrangement of a cutter on a lathe spindle, Fig. 3ᵃ a modification of the springy split ring.

Referring to Fig. 1. 1 designates a drill chuck having a conical seat in its front end, in which engages a correspondingly conical sleeve 2 designed for the reception of a drill therein and flanged at its front end for engagement of the latter by a cap nut 3 screwed over said chuck so as to clamp said sleeve in the seat of said chuck, a springy split ring 4 being inserted in an inner annular recess 5 of said nut so as to bear against the underside of the flange of said conical sleeve.

For forming the screw-joint, first the sleeve 2 is inserted in the cap nut 3, whereupon the springy split ring 4 is inserted in the inner annular recess 5 of said nut so as to bear against the underside of the flange of said sleeve, the latter being then introduced into its conical seat in the chuck 1 and the cap nut 3 being finally tightened. When again unscrewing said nut, the ring 4 acts to simultaneously withdraw said sleeve from its conical seat.

Fig. 2 shows the chuck 1 of the former example inserted with its flanged conical shaft 1ᵃ in a correspondingly conical seat in the front end of a lathe spindle 6, to which it is secured by means of a cap nut 3ᵃ having a springy split ring 4ᵃ in its inner annular recess 5ᵃ, said split ring bearing against the underside of the flange of said conical shaft 1ᵃ.

Fig. 3 shows the arrangement of a cutter on the flanged conical centre-pin 1ᵇ of a lathe spindle, said pin being secured in the conical seat in the front end of said lathe spindle 6ᵃ by means of a cap nut 3ᵇ having a springy split ring 4ᵇ (Fig. 3ᵃ) in its inner annular recess 5ᵇ, said split ring bearing against the underside of the flange of said conical centre-pin 1ᵇ. The cutter 8 has a conical seat in its rear end for engagement with the correspondingly conical front end 7 of said centre-pin 1ᵃ, a nut 9 screwing over the cap nut 3ᵇ and securing said cutter 8 in place.

Fig. 3ᵃ shows a split ring fitted with a hook $a$ or an eye $b$ at its ends for its being easily inserted in or removed from said cap nut.

What I claim, is:—

The combination with a flanged conical member, a body having a correspondingly conical seat in one end for the reception of said conical member therein, and a cap nut screwed over said body and engaging over the flange of said member, said nut having an inner annular recess therein, a springy split ring fitting in said recess so as to form an inner projection in said nut and to bear against the underside of the flange of said member, substantially as and for the purpose set forth.

In testimony whereof I have hereunto set my hand.

PAUL GROSSET,